Figure 1:
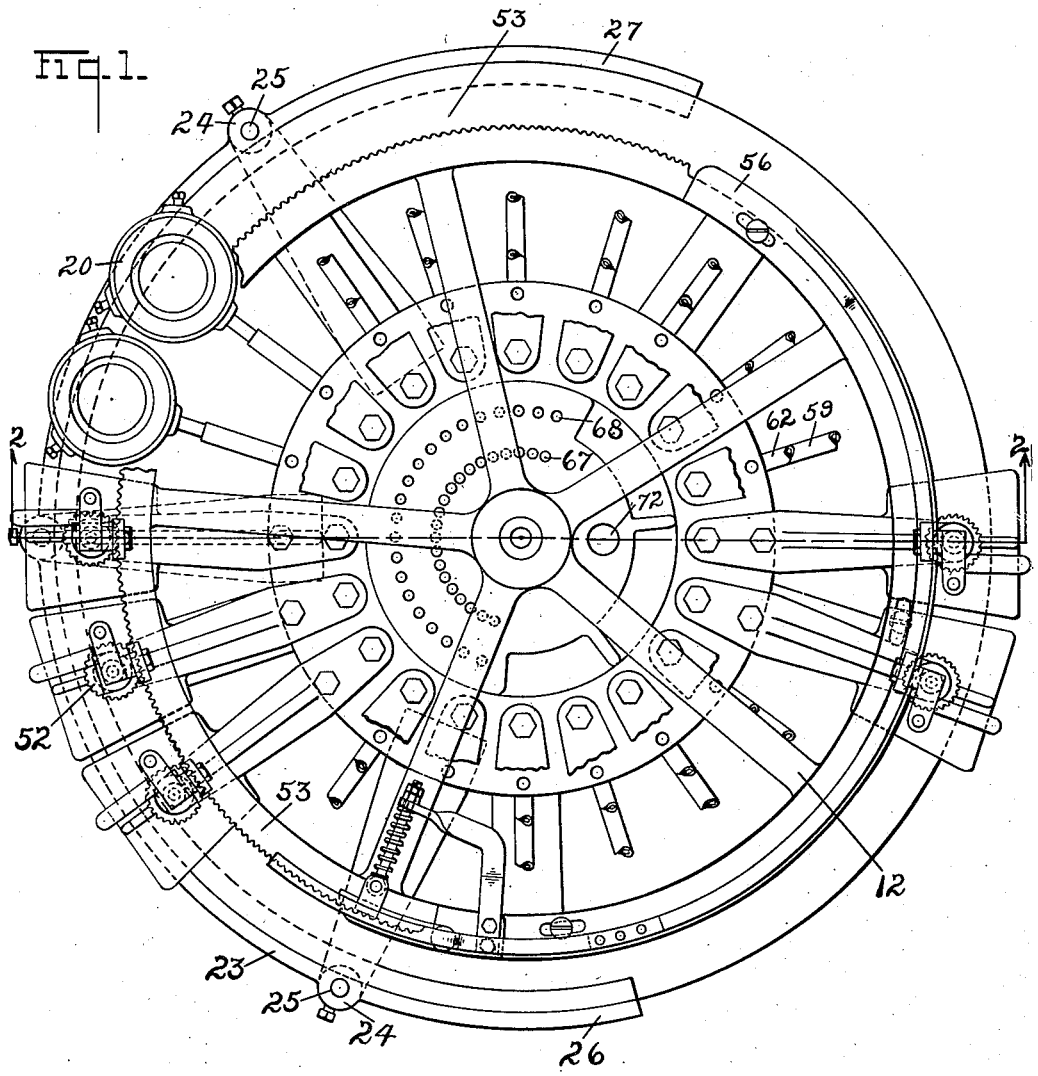

March 23, 1926.

E. C. SCHRADER 1,577,543

METHOD OF AND APPARATUS FOR SEVERING GLASS

Filed March 26, 1923　　4 Sheets-Sheet 1

INVENTOR
Ernest C. Schrader
By Owen, Owen & Crampton
His Attorneys

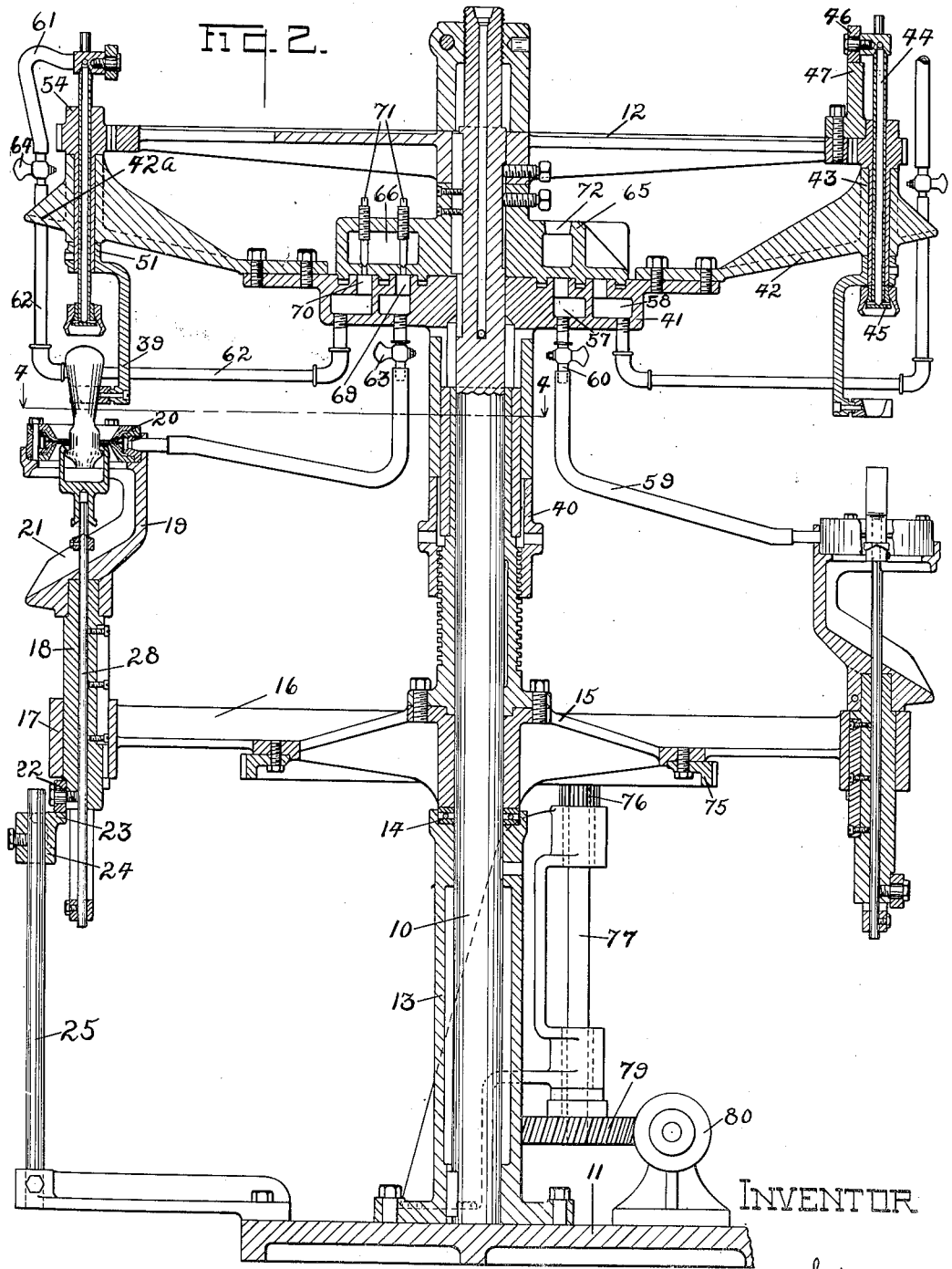

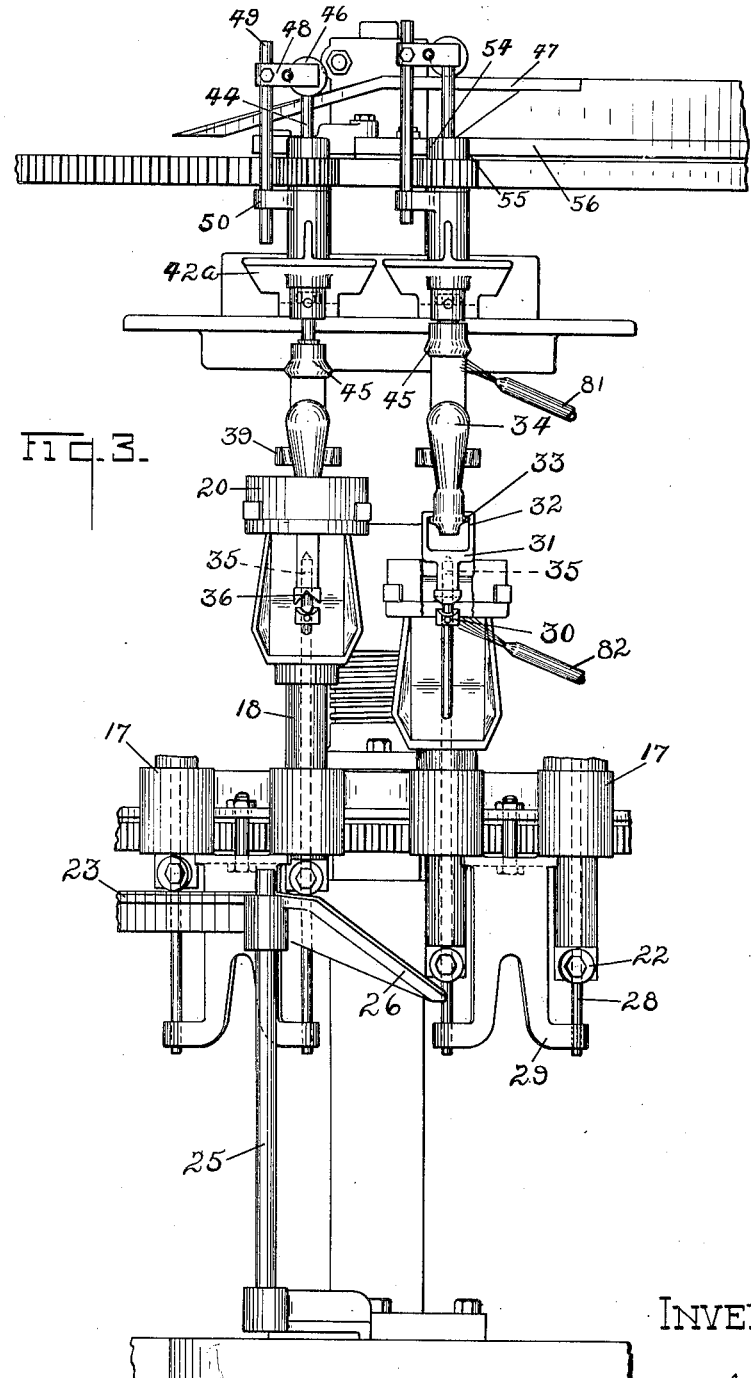

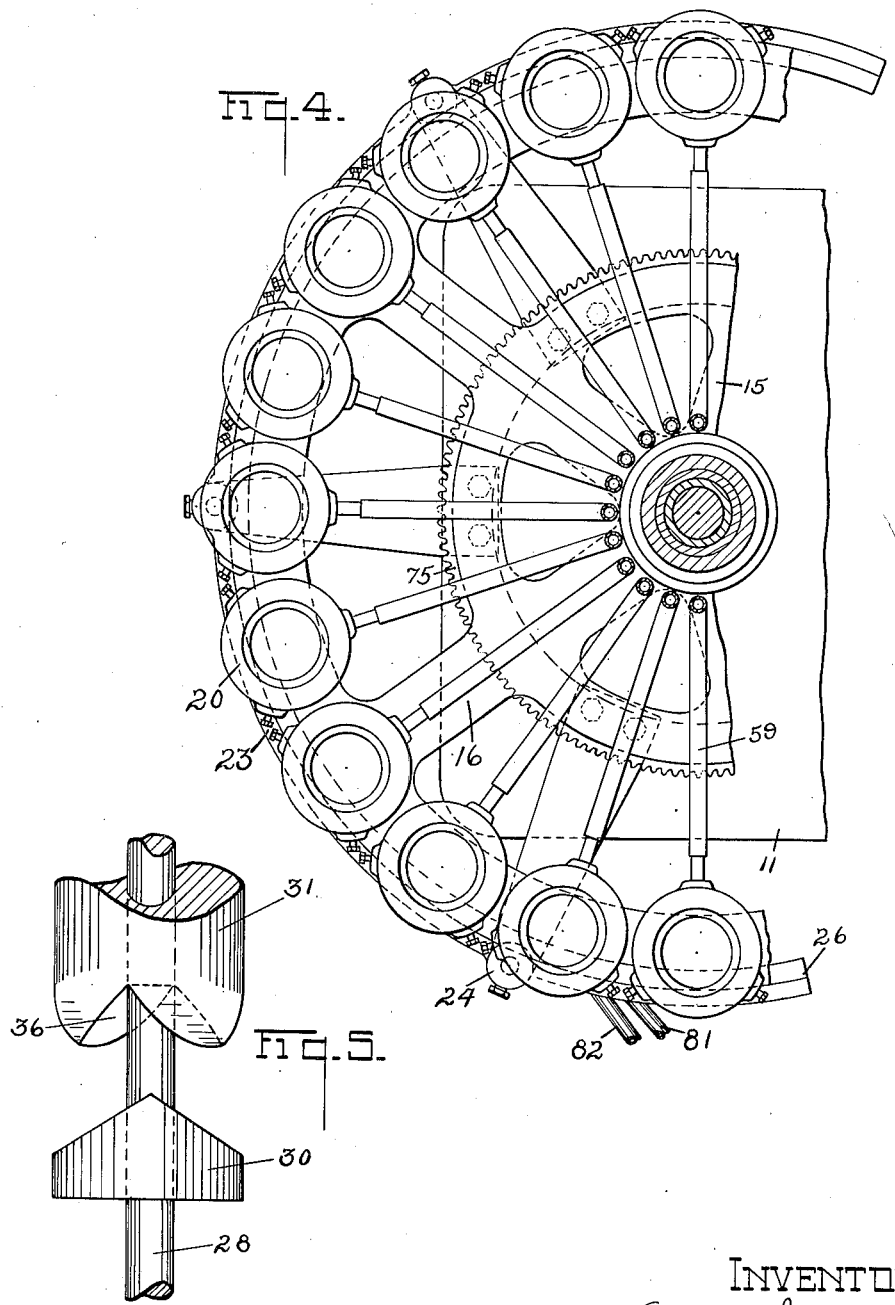

Patented Mar. 23, 1926.

1,577,543

UNITED STATES PATENT OFFICE.

ERNEST C. SCHRADER, OF TOLEDO, OHIO, ASSIGNOR TO THE LIBBEY GLASS MANUFACTURING COMPANY, OF TOLEDO, OHIO, A CORPORATION OF OHIO.

METHOD OF AND APPARATUS FOR SEVERING GLASS.

Application filed March 26, 1923. Serial No. 627,762.

*To all whom it may concern:*

Be it known that I, ERNEST C. SCHRADER, a citizen of the United States, and a resident of Toledo, in the county of Lucas and State of Ohio, have made an invention appertaining to a Method of and Apparatus for Severing Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a method of and apparatus for severing glass, and more especially it relates to the trimming of the necks of hand blown bulbs.

I have illustrated and will describe my invention as applied to the manufacture of incandescent lamp bulbs which, as blown have necks that need to be cut off or trimmed, but its utility is not confined to bulbs. When a bulb is made by an automatic machine, its neck terminates in a comparatively heavy ring of glass which supported the blank during the manipulation thereof by the machine. It is old to position such a bulb with its neck down, melt a narrow ring around the neck and allow the weight of the heavy end to draw the neck down until it is severed. When the glass to make the bulb is gathered by hand, the neck of the bulb terminates in a moil which was attached to the blow pipe. This moil is not usually heavy enough to draw down the neck of the bulb in the manner that the heavy ring of the machine-made bulb draws it down, but hand-made bulbs have been severed in the same way by attaching weights to the moil.

As heretofore practiced, the bulb has been rotated adjacent one or more flames which played upon its neck, and, when heated in this manner, the neck melts for a sufficient distance on each side of the line at which severance is desired so that the neck narrows in as it is drawn down and after severance the end of the neck has to be finished in some manner to remove this inwardly slanting flange of glass.

I apply a very thin and hot annular flame, such as may be produced by the burner disclosed in the United States patent granted to me December 4, 1923, No. 1,476,184, to the line of severance of the moil. I also apply a flame to the top of the bulb while the neck is being melted off. One of my improvements is the blowing of a bead in the neck of the bulb between the point of attachment to the blow iron and the line of severance of the moil and the use of this bead in applying strain to the line of severance during the melting off process. Another improvement lies in the apparatus devised for putting a strain upon the article during severance. Other features of the invention will appear as the description proceeds and will be pointed out in the appended claims.

Referring to the accompanying drawings, Figure 1 is a plan view of the apparatus; Fig. 2 is a vertical section on line 2—2 of Fig. 1; Fig. 3 is a side elevation of a portion of the apparatus; Fig. 4 is a partial horizontal section on the line 4—4 of Fig. 2; and Fig. 5 is a detail view of the weight and its positioning means.

A central vertical column 10 is supported on a base 11 and carries attached to its upper end a spider 12. Surrounding the lower end of the column is a pedestal 13 carrying on its upper end a bearing 14. A hub 15 is mounted about the column upon the bearing 14 and carries a spider 16. In the periphery of this spider 16 is a series of bearings 17 in each of which there is a vertically reciprocable hollow shaft 18. Each shaft 18 carries on its upper end a casting 19. Each casting 19 has a seat at its upper end for an annular burner 20, and beneath the burner is an outwardly slanting chute 21. The lower end of each shaft 18 carries a roller 22, which is adapted to run on a cam track 23, supported by collars 24 upon supporting rods 25. The main part of the cam track 23 is substantially horizontal, but it has downwardly turned ends 26 and 27 so that shaft, casting and burner are held elevated while the roller is traversing the main part of the cam track, but are lowered the remainder of the time. Mounted within each hollow shaft 18 there is a relatively stationary rod 28. A series of brackets 29 are bolted to the under side of the periphery of the spider 16, and each bracket 29 supports the lower ends of two of the rods 28. Near the upper end of each rod 28 there is an adjustably-fixed collar 30. A weight 31 has arms 32, adapted to be hooked over a bead 33 on a bulb 34, and there is a socket 35 in the lower end of the weight adapted to receive the upper end of a rod 28. The lower end of the weight is notched, as at 36 to fit the inverted V-shaped upper side of the collar 30, whereby, when the weight drops, it will be automatically turned to the position in which it is shown at the right of Fig. 3.

Above the hub 15 there is a longitudinally-adjustable sleeve 40, supporting at its upper end a chambered disk 41. A spider 42 is affixed to the disk 41 and carries in its periphery a series of bearings 43 for vertically-reciprocable hollow shafts 44. Each of these shafts carries a burner 45 at its lower end, and is carried at its upper end by a roller 46, adapted to run upon a cam track 47. Each shaft 44 has affixed to its upper end a bracket 48, carrying a rod 49, which is vertically reciprocable within a socket 50 in the spider. (See Fig. 3.) The rod 49 is adjustable in the bracket 48, and when the roller 46 runs off from the cam track 47 the rod 44 and its burner will be lowered until the rod 49 strikes the extension 42ª of the spider 42. By adjusting the rod 49 in the bracket 48, the point to which the hollow shaft and its burner is lowered may be accurately controlled.

Surrounding the hollow shaft 44 is a sleeve 51 carrying on its lower end a fork 39 adapted to receive a bulb. On the upper end of the sleeve 51 is a gear 52, adapted to mesh with a rack 53. The rack 53 is substantially 190° in length, as shown on Fig. 1, and the gear 52 carries on its upper surface a protuberance 54, having a flattened side 55, and this flattened side 55 engages a member 56 during the portion of the travel of the gear when it is not engaged by the teeth on the rack 53, so that during the time that the sleeve with its bulb carrying fork is not being revolved it will be held in the position in which it is shown in Fig. 2 and a bulb may be readily taken out or placed in the fork while it is not rotating.

The disk 41 has a series of chambers 57 and 58, and a flexible pipe 59 leads to each annular burner from a nipple 60 connecting with a chamber 57. In like manner a flexible pipe 61 is attached to the top of each hollow shaft 44 and connects by means of pipe 62 with a chamber 58. Valves 63 and 64 may be placed at convenient points in the connections between the burners and the chambers. A plate 65 has a chamber 66 with two series of holes 67 and 68 (Fig. 1), beneath which orifices 69 and 70, leading into chambers 57 and 58, will pass. A needle valve 71 is provided for each orifice in each series, so that the amount which each orifice is opened may be accurately and independently adjusted. There is a separate chamber 57 for each burner 20, and a separate chamber 58 for each burner 45. A suitable mixture of gas and air may be introduced into the chamber 66, as through orifice 72.

To the lower side of spider 16 there is attached an annular rack 75, adapted to be driven by a gear 76 on one end of a shaft 77, which has on its other end a worm gear 77, driven from any suitable source power, as motor 80.

In use, the apparatus is driven continuously, and the bulbs are placed in the forks while the forks are passing around the side of the machine where the surface 55 is in engagement with the member 56, so that the forks are held in proper position to receive the bulbs. When a fork reaches the position shown at the right in Fig. 3, the bulb will have been placed therein. It will be noted from that figure that until this time the burner is lowered, leaving accessible the upper end of the weight 31, so that when hand-made bulbs are being trimmed and annealed the bead blown on the bulb may first be positioned beneath the ends of the arms 32 of the weight 30 and then the bulb and weight lifted enough to allow the body of the bulb to be slipped into the fork 39. As the unit passes from the position shown at the right in Fig. 3 to the position shown at the left, the hollow shaft carrying the burner is elevated, so that the annular burner will be properly positioned around the line at which the neck of the bulb is to be trimmed, and the burner 45 is lowered to suitable relation with the top of the bulb. As will be noted by a comparison with Fig. 1, the fuel is supplied to the burners at about this point. Stationary burners 81 and 82 (Fig. 3) may be positioned adjacent the points that the burners 20 and 45 will occupy when the fuel is turned on, so as to light the latter.

As the unit continues in its movement, the gear 52 will mesh with the rack 53 and the fork 39 will rotate the bulb so that the neck will be melted uniformly in spite of any possible irregularities in the flame. The glass being thin and being continuously exposed to the hot point of a thin flame, it will be melted very quickly along a narrow line, so that the weight will draw down the waste end of the neck and it will be cleanly severed along the desired line without any objectionable deformation of the remaining end of the neck. When the moil is melted off it will drop down and out from between the arms of the weight and be guided outward by the chute to a suitable cullet receptacle, not shown. When the weight drops, it will be automatically turned to proper position to conveniently receive another bulb. The top of a bulb will be heated by burner 45 to some extent at the same time that the heat rising from burner 20 will heat the sides, so that by this means the bulb is annealed sufficiently for all practical purposes, and the loss of bulbs is found to be extremely low when this method and apparatus are used. The needle valves 71 may be adjusted so as to give the desired amount of fuel to the burners 20 and 45 at each point in their travel and to shut off the supply entirely at the desired point. In practice, the burning off operation is completed in about 30° travel, whereas the annealing operation may require the entire 190°. If individual burners should vary slightly in their characteristics, the amount of fuel which they receive may be regulated by turning their individual valves 63, 64.

When desired the valves may be adjusted so that the flames will continue, though with reduced intensity, for some time after the severance is completed.

Other articles besides bulbs may be severed by the use of my process and apparatus and changes may be made in the process and apparatus within the scope of the appended claims without departing from the spirit of the invention.

I claim:—

1. A method of making glass articles, comprising blowing an article with a bead between the point of its attachment to the blow iron and the line of severance of the moil, utilizing the bead to apply stretching strain to said line of severance, and melting the glass along said line while the strain is being applied.

2. A method of making glass bulbs comprising blowing a bulb with a bead in its neck between its point of attachment to the blow iron and the line of severance of the moil, supporting the bulb from its enlarged upper portion with its neck downward, suspending a weight from the bead on its neck, and subjecting the neck above the bead to an annular flame and thereby melting the neck so that the weight will pull off the surplus glass.

3. Apparatus for severing glass articles having forms of rotation, comprising means for supporting such an article from its upper end, an annular burner located beneath and in alinement with said supporting means, means for vertically reciprocating said burner, and means for producing relative rotation between the burner and the support.

4. Apparatus for finishing glass bulbs comprising a support in which a glass bulb may be positioned with its neck downward, an annular burner located beneath and in alinement with said support, means for lowering the burner out of the way of a bulb being positioned in the support, and means to raise the burner to surround the bulb at the line where the surplus glass is to be removed.

5. Apparatus for finishing glass articles, comprising means for supporting an article neck down, a forked weight adapted to be hung on a bead on the neck of an article so supported, a vertical guide for the weight, and means for melting off the neck of the article above the bead.

6. Apparatus for finishing glass articles, comprising means for supporting an article neck down, means to rotate the support about the axis of a supported article, a forked weight to be hung on a bead on the neck of an article so supported, a guide for the weight, means to melt off the neck of the article above the bead, the guide allowing the weight to turn with the neck of the article until it is melted off, and cooperating means on the guide and weight for turning the weight to a predetermined position when the weight is dropped by the melting off of the neck.

7. Apparatus for finishing glass articles, comprising means for supporting an article neck down, a weight adapted to be hung on the neck of an article so supported, a vertical rod upon which the weight is adapted to slide, an annular burner, and means to lower the burner about the rod beneath the weight and to raise it above the weight about the neck of an article from which the weight is suspended.

8. Apparatus for finishing glass articles, comprising means for supporting an article neck down, a weight adapted to be hung on the neck of an article so supported, a vertical rod upon which the weight is adapted to slide, a collar on the rod in position to support the weight when it is dropped, the engaging surfaces of the collar and weight being adapted to automatically turn the weight to selected position when it falls, an annular burner, and means to lower the burner about the rod beneath the weight and to raise it above the weight about the neck of the article from which the weight is suspended.

In testimony whereof I have hereunto signed my name to this specification.

ERNEST C. SCHRADER.